(12) United States Patent
Haase (10) Patent No.: US 7,229,550 B2
(45) Date of Patent: Jun. 12, 2007

(54) POTABLE WATER TREATMENT SYSTEM AND APPARATUS

(76) Inventor: Richard A. Haase, 4402 Ringrose Dr., Missouri City, TX (US) 77459

( * ) Notice: Subject to any disclaimer, the term of this patent is extended or adjusted under 35 U.S.C. 154(b) by 0 days.

(21) Appl. No.: 10/348,071

(22) Filed: Jan. 21, 2003

(65) Prior Publication Data

US 2003/0132167 A1 Jul. 17, 2003

Related U.S. Application Data (63) Continuation-in-part of application No. 09/918,246, filed on Jul. 30, 2001, now abandoned, and a continuation-in-part of application No. PCT/US00/10657, filed on Apr. 19, 2000, which is a continuation of application No. 09/298,155, filed on Apr. 23, 1999, now abandoned.

(51) Int. Cl.
*C02F 1/50* (2006.01)
*C02F 1/72* (2006.01)
*C02F 5/08* (2006.01)

(52) U.S. Cl. .................. 210/87; 210/96.1; 210/101; 210/143; 210/199; 210/203; 210/284; 422/110

(58) Field of Classification Search .............. 210/96.1, 210/97, 101, 143, 199, 202, 203, 258, 284; 422/108, 110
See application file for complete search history.

(56) References Cited

U.S. PATENT DOCUMENTS

| | | | | |
|---|---|---|---|---|
| 3,853,753 A | * | 12/1974 | Jones ...................... 210/708 |
| 4,640,793 A | * | 2/1987 | Persinski et al. ........... 252/180 |
| 4,855,061 A | * | 8/1989 | Martin ...................... 210/709 |
| 5,178,768 A | * | 1/1993 | White, Jr. .................. 210/663 |
| 5,302,321 A | * | 4/1994 | Akama et al. .............. 252/396 |
| 5,419,836 A | * | 5/1995 | Ray et al. .................. 210/697 |
| 5,547,584 A | * | 8/1996 | Capehart .................... 210/669 |
| 5,741,416 A | * | 4/1998 | Tempest, Jr. ............... 210/90 |
| 5,895,565 A | * | 4/1999 | Steininger et al. ........... 210/85 |
| 5,935,426 A | * | 8/1999 | Giordano et al. ............ 210/87 |
| 6,051,140 A | * | 4/2000 | Perry ........................ 210/663 |
| 6,638,421 B2 | * | 10/2003 | Murayama et al. ........ 210/96.1 |
| 7,011,751 B1 | * | 3/2006 | Waldner et al. ............. 210/199 |

OTHER PUBLICATIONS

Implementation Guidance for the Interim Enhanced Surface Water Treatment Rule, US EPA, Office of Water (4606), EPA 816-R-01-011, Jun. 2001.

* cited by examiner

*Primary Examiner*—Peter A. Hruskoci (57) ABSTRACT

In the present invention, a potable water treatment system and apparatus for purifying and treating potable water that is being transferred from a potable water source to a number of potable water user(s) via a potable water line is presented. Said potable water purification and treatment system and apparatus has a filter capable of filtering the potable water to an NTU of less than 0.10, removing TOC and disinfection by-products, as well as a chemical feed system which comprises a measuring device for measuring at least one of: the potable water flow and the potable water quality, at least one proportioning device for determining any amount(s) of chemical additives utilizing input(s) from the measuring device(s) and at least one chemical feed pump to transfer at least one chemical additive to the potable water, wherein at least a disinfectant is added to the potable water downstream of filtration. In addition to disinfectant addition, said potable water purification and treatment system and apparatus has the capability to add at least one of a: chelant, dispersant, oxidizer, metal coagulant, buffer and/or any combination therein. While the measuring device, proportioning device and/or chemical pump can be one unit, each can be separate or combined in any combination providing that the required chemical(s) and amount of chemical(s) is pumped or successfully transferred to the potable water. The method of operation of the potable water treatment system and apparatus is also presented.

66 Claims, 1 Drawing Sheet

Figure 1
POTABLE WATER TREATMENT SYSTEM, APPRATUS AND METHOD OF OPERATION THEREOF

POTABLE WATER TREATMENT SYSTEM AND APPARATUS

RELATED APPLICATION DATA

This application is a continuation-in-part of U.S. application Ser. No. 09/918,246 filed Jul. 30, 2001, now abandoned, and PCT Application PCT/US00/10657 filed Jul. 31, 2000, which are continuations of U.S. application Ser. No. 09/298,155 filed Apr. 23, 1999, now abandoned.

FIELD OF THE INVENTION

In the field of water treatment, this invention relates to improved methods of treatment of potable water. This invention provides a potable water treatment system, apparatus and methods of operation thereof, comprising a chemical feed system and apparatus for administering at least one chemical additive or a number of chemical additives to the potable water. This invention may contain at least one filter media or a number of filter media to filter the potable water in order to improve the purity of the potable water. This invention can be used on municipal potable water or on industrial potable water or on potable water from wells. This invention comprises at least one pump controlled via a measuring device and a proportioning device to add at least one chemical in proportion to the quantity of the potable water flowing form a potable water line to potable water using entities.

BACKGROUND OF THE INVENTION AND DESCRIPTION OF THE PRIOR ART

A major issue with which potable water consumers (including, but not limited to residential, office, public and commercial buildings) have been faced is the ability to control at least one of: taste, odor, turbidity, bacterial and/or viral contamination, heavy metal contamination, hardness, mineral deposits and/or a combination of these water quality parameters form potable water sources. Calcium and/or magnesium exist in potable waters in the form of salts, which are normally soluble in the form of sulfates, carbonates, bicarbonates or chlorides. Often the soluble salts are ionized so that the water contains a relatively high concentration of calcium and/or magnesium ions. While waters can be classified according to hardness as soft water or hard water, the harder is the water the greater the amount of calcium and/or magnesium. In low hardness, soft, potable waters, the water is often acidic causing the corrosion of metal materials thereby placing soluble metal ions in the water, which are dangerous to health and reduce the life of metal materials.

Current technologies for mineral and/or metal removal involve distillation, lime-softening, cation exchange, water softening compounds and membrane filtration. By distillation, condensation of steam provides pure water, which has been evaporated from the mineral and metal ions. Distillation is very energy intensive; and, very pure water from distillation is not good for human health as water which is too low in mineral content will literally remove minerals from the human body into the bloodstream as the body absorbs the water. Lime softening plants are very expensive to build and to operate; therefore, these plants are not installed as often as needed. Cation exchange softening is performed, wherein sodium and/or potassium is exchanged for the mineral nutrient of calcium and/or magnesium. Cation exchange softeners cause an increase in the sodium or potassium content of the water and a near elimination of calcium and/or magnesium, which are both nutrients required for good health. Water softening compounds (e.g. sodium carbonate (washing soda), tri-sodium phosphate which is sold under various trade names, lime soda ash (sodium phosphate) and sodium silicate) which are used for softening potable water, also place sodium in the water; and under conditions of high concentration, can render the water highly alkaline, which is objectionable to human health. High amounts of alkalinity will also attack the fibers in clothes during washing. High amounts of alkalinity resulting from water softening compounds can render the water salty. Another technology, which has seen increased use is membrane filtration or reverse osmosis filtration. While effective, these systems are costly, require regular replacement and remove calcium and/or magnesium from the water to the point of the water not being good for human health, similar to distillation.

In addition to hardness, heavy metals contaminate potable water; heavy metals that contaminate may be but are not limited to: iron, copper, chromium, aluminum, manganese, zinc, cadmium, lead, tin, titanium, nickel, arsenic, silica, silicates and others. Contamination and the combination of contaminant(s) depend on the source of the potable water.

Heavy metal contamination is bad for human health and leads to staining and/or deposition on material surfaces. Metals and/or heavy metals can be measured in water by spectraphotometry. Contamination of potable water by metals, in the form of hardness and/or in the form of heavy metals, may deposit on the surface of materials. Deposition is dependent upon the water chemistry, yet is normally one of two types: scale deposits and sludge deposits. These deposits are often found on the inside of water lines and water heaters, as well as on the surface of materials which contact the water such as: glassware, tile, faucets and showerheads. Scale deposits are normally crystallized metal salts and sludge deposits are normally salts which have crystallized elsewhere consisting of discrete and usually non-uniform particles. Compared to other precipitation reactions, the crystallization of scale deposits is a slow reaction and, thus promotes the formation of a fairly well-defined, slow, in-place crystal growth, resulting in deposition of a hard, dense, glassy and highly insulating material.

Scale deposits can localize corrosion causing water lines and equipment to leak. After deposition has started, the deposits become bound to one another. Scale deposits often result in equipment replacement, such as water heaters, tile, glassware, piping, etc. Sludge deposits are not such a challenge; sludge deposits, though, are unsightly to the homeowner or potable water user.

Large scale water treatment facilities use coagulation and filtration to remove solids from water to make the water potable. While this is possible in surface water, solids are often not removed from well water. In any event, often surface water treatment does not adequately and effectively remove solids, as well as adequately remove solid forming or scale forming impurities from the water. Various chemical water treatments have been used to prevent and remove scale and sludge from water.

Years ago, phosphate control was introduced to minimize wide-spread calcium carbonate scaling throughout water lines by eliminating calcium carbonate scale formation in favor of a precipitate that could produce sludge. Inhibitors used to inhibit calcium and magnesium salt scale and the localized corrosion due to salt scale are: inorganic phosphate compounds, such as phosphoric acid, pyrophosphoric acid, hexametaphosphates, pyrophosphates, polypyrophosphates, polyhexametaphosphates and organic phosphoric compounds such as alkyl phosphates or phosphonates. An adequate inhibitor concentration can easily be determined by measuring the conductivity in the water, as chelated minerals and/or metals are not conductive. If insufficient water alkalinity is maintained, however, magnesium can combine with phosphate, forming magnesium phosphate, a particle with a surface charge that makes it very prone to adhere to materials, especially metal equipment. Further, use of the low molecular weight acid variants may lead to corrosion on metal surfaces and in high concentrations and/or at high temperatures (normally above 130° F.) all of these inhibitors can lead to the formation of phosphate and/or chloride salt scale, wherein the cation may be at least one of: calcium, magnesium, silica and/or a combination thereof. Potable water chemical treatments generally involve a chelating or precipitating agent such as soda ash, phosphoric acid, pyrophosphoric acid, sodium or potassium phosphate, sodium or potassium phosphate polymers (such as polyhexametaphosphates or polypyrophosphates, etc.) or organic phosphate polymers (such as sodium or potassium phosphonates) and/or a combination of these. However, high concentration or high temperature scale deposition is not solved in potable water with these inhibitors.

Industrially, in very high temperature applications, dispersants have been utilized to prevent the formation of scale and/or sludge from phosphate and/or chloride salts. These dispersants are normally derived upon acetate or acrylate chemistry. However, these chemicals have had sparing use in potable water treatment and have only been applied at the surface water treatment facility or in combination with membranes to limit membrane fouling, if used at all. Further, the use of phosphate inhibitor chemistry is infrequent in potable water.

The chemistry of using a phosphate to chelate calcium, magnesium and metals is well known. Alkalinity, hardness and temperature are the factors in using phosphates for chelation. Alkalinity or hardness can be measured with spectraphotometry. Municipalities have on an infrequent basis been adding a variety of phosphates and phosphate polymers to potable water for decades to control mineral and metal deposition. However, the goals of municipalities and the goals of potable water users are rather incongruent. Municipalities add phosphates and phosphate polymers to control corrosion and/or scaling in metal pipes of water lines and to control consumer complaints from mineral and/or metal deposition staining on clothing and plumbing fixtures. In recent years, some municipalities have begun to install concrete and plastic pipes for water lines and, thus, no longer add any phosphate polymers to the potable water. Again, even if municipalities would provide enough phosphate or phosphate polymer to potable water to prevent low temperature scale, at temperatures above 130° F., high temperature salt scale deposition will still occur. Municipalities do not add any dispersing agent(s) to prevent calcium, silicon, silica or magnesium phosphate build-up in hot water lines and equipment. As a result, potable water users often must pay additional expenses for at least one of: laundry, cleaning, plumbing, plumbing fixtures, bathroom fixtures, tile, glass, appliances and water heating equipment due to the formation of phosphate salt mineral deposits, wherein the cation is at least one of calcium, silica, magnesium and/or a combination thereof.

Further, NSF International analyzes the toxicity of chemical additives to drinking water, potable water, applications. Phosphates, dispersants, metal coagulants and disinfectants as well as any chemical, have a dosage limit in their application in potable water; therefore, the addition of phosphates, or any chemical for that matter, to a potable water stream must be regulated and proportioned to the water flow rate.

Turbidity is a critical parameter to human health in potable water. Turbidity is a measure of particle contamination, which is performed by sending and receiving light scatter through a sample of the water; turbidity is reported as NTU (Nephelometric Unit). Turbidity is used as a measure of bacterial, viral and/or animal contamination. Animal contamination can exist from species such as *Cryptosporidium parvum* and/or *Giardia lamda*; contamination from these animal species is of particular importance due to their known ability to cause waterborne disease. In particular, Cryptosporidium is the contaminant that made thousands sick in Milwaukee causing The U.S. EPA to re-evaluate the drinking water standards. Giardia is particularly common from animal feed lots, cattle and pigs. For the elderly, infants and/or those with weakened immune systems, infection can be fatal, as occurred to dozens in Milwaukee. Ninety-seven percent of surface water sources and most of the well water sources are known to be contaminated with animals and nearly all sources are contaminated with at least one of bacteria, virus and/or animal species. Research by The U.S. EPA has determined that an NTU of 0.10 or less reduces these contaminates by 4 to 6 log, as well as to concentrations which are of less concern and with which the human body can cope.

TOC and disinfection by-products are both critical parameters to human health. TOC is critical because TOC reacts with disinfectants to form disinfection by-products. Disinfection byproducts are carcinogenic and/or teratogenic, as well as toxic. TOC can be reliably measured in potable water by spectraphotometry. The U.S. EPA has regulations for the allowable concentration of TOC and of disinfection by-products in drinking water.

There are currently many Point-of-Use (POU) devices and Point-of-Entry (POE) devices known in the art of potable water purification. POU devices are designed, literally, for the point of use, a.k.a. a sink, refrigerator, washing machine, showerhead, etc. POE devices are designed for the point of entry into the building, a.k.a. the water line at entry. These devices have one common feature, a filter media. This filter media is made of carbon, cloth or of membrane construction and is sized so as to be rated in microns of porosity to determine particle filterability. However, these devices have another feature; these devices do nothing to control mineral or metal salt deposition. Further, these devices are a health risk to the potable water user since the disinfectant (which is normally chlorine, yet can be chloramine, bleach or chlorine dioxide) is removed by the filter media leaving the remaining section of pipe, equipment, plumbing, fixture or appliance available to biological and/or viral growth. Disinfectant concentration can easily be measured with spectraphotometry.

The present invention is the first potable water purification device, POU or POE, which provides the ability to maintain calcium and/or magnesium in the water while providing protection from scale and sludge deposition. The present invention is the first potable water purification device that filters the water while maintaining a disinfectant concentration in the water downstream of the filter media to control bacterial and viral growth.

In the prior art, devices and systems that have been used to add a chemical to potable water at potable water pressures resort to first passing the potable water into a reservoir and then dripping chemical additives in to the reservoir with a pump. Methods of application of such systems and devices can be relatively complex and costly and require very careful control. The present invention does not require passing of the potable water into a reservoir. In the present invention, the potable water can be purified and treated without using any complicated equipment. In a preferred embodiment, the chemical additive(s), which is at least a disinfectant, which can be combined with at least one of: an oxidizer, a chelant, a dispersant and/or a combination thereof is added to the water by using a measuring device, a proportioning device and a chemical pump. Thus, the potable water treatment system and apparatus is preferred particularly for the potable water users. The potable water users can obtain a filtered and disinfectant containing potable water, which: has been oxidized prior to filtration if necessary, chelated if necessary and dispersed if necessary, wherein the natural mineral ions are maintained in the water without an increase to the alkalinity of the water, thereby not creating water that can damage the skin, piping, fixtures, tile, water heating equipment or any material in contract with the water, nor create water which will reduce the mineral content of the human body or add sodium to the human body.

Several related patents that have been issued in the past decades are:

U.S. Pat. No. 1,903,041 issued to Hall, et al., on Mar. 28, 1933 presents a water treatment process in a steam boiler, wherein a chemical containing a molecularly dehydrated phosphate radical is supplied to the boiler water and is then re-hydrated in the water to a condition of greater alkali-neutralizing capacity.

U.S. Pat. No. Re. 19,719 issued to Van Tuyl on Oct. 8, 1935 presents a process of softening water containing an alkaline-earth metal compound. The process comprises adding an alkali-earth metal phosphate which is water soluble and capable of sequestering calcium in a slightly ionized condition in an amount sufficient to effectively suppress the soap-consuming alkaline-earth metal ion concentration.

U.S. Pat. No. 2,142,515 issued to Joos on Jan. 3, 1939 presents a water softening method which comprises treating water in a reaction zone with lime and soda to reduce the hardness of the water. In a second reaction zone, the water is treated with tri-sodium phosphate and sodium hydroxide in proportions to provide in the treated water an excess of tri-sodium phosphate.

U.S. Pat. No. 2,304,850 issued to Rice on Dec. 15, 1942 presents a process of precipitating dissolved ions in well water. The process comprises adding to the water in the well, before it is exposed to air, molecularly dehydrated alkali-metal phosphate in a part per million concentration ratio to the ion concentration.

U.S. Pat. No. 2,596,943 issued to Sheen on May 13, 1952 presents a proportional feed system. The proportional feed system is an electric proportioning pump for supplying liquid to a system in response to electric circuit operation, comprising a solenoid adapted to be energized at intervals by the electric circuit operatively connected to the pump and controlling the extent and speed of operation of the pump and adjustable stop in the shock absorber for limiting the length of stroke of the pump.

U.S. Pat. No. 2,874,719 issued to Van Tuyl on Feb. 24, 1959 presents a device for feeding additives into a moving liquid. The device comprises a housing having an additive supply source, a first bore and a second bore being spaced from each other, an additive inlet channel leading from the additive supply source to the first bore, an additive outlet channel being offset laterally from said additive inlet channel, means in the second bore restricting the flow of liquid in the second bore, and, disposed between said additive inlet channel and said additive outlet channel, a valve assembly incorporating a check valve responsive to the flow of liquid in the second bore and a manually adjustable needle valve for controlling the rate of flow of the additive through said additive outlet channel into the second bore, one of the valves being disposed within the other.

U.S. Pat. No. 4,209,398 issued to Li, et al., on Jun. 24, 1980 presents a process for treating water to inhibit formation of scale and deposits on surfaces in contact with the water and to minimize corrosion of the surfaces. The process comprises mixing in the water an effective amount of water soluble polymer containing a structural unit that is derived from a monomer having an ethylenically unsaturated bond and having one or more carboxyl radicals, at least a part of said carboxyl radicals being modified, and one or more corrosion inhibitor compounds selected from the group consisting of inorganic phosphoric acids and water soluble salts therefore, phosphonic acids and water soluble salts thereof, organic phosphoric acids and water soluble salts thereof, organic phosphoric acid esters and water-soluble salts thereof and polyvalent metal salts, capable of being dissociated to polyvalent metal ions in water.

U.S. Pat. No. 4,442,009 issued to O'Leary, et al., on Apr. 10, 1984 presents a method for controlling scale formed from water soluble calcium, magnesium and iron impurities contained in boiler water. The method comprises adding to the water a chelant and water soluble salts thereof, a water soluble phosphate salt and a water soluble poly methacrylic acid or water soluble salt thereof.

U.S. Pat. No. 4,631,131 issued to Cuisia, et al., on Dec. 23, 1986 presents a method for inhibiting formation of scale in an aqueous steam generating boiler system. Said method comprises a chemical treatment consisting essentially of adding to the water in the boiler system scale-inhibiting amounts of a composition comprising a copolymer of maleic acid and alkyl sulfonic acid or a water soluble salt thereof, hydroxyl ethylidenel, 1-diphosphic acid or a water soluble salt thereof and a water soluble sodium phosphate hardness precipitating agent.

U.S. Pat. No. 4,640,793 issued to Persinski, et al., on Feb. 3, 1987 presents an admixture, and its use in inhibiting scale and corrosion in aqueous systems, comprising: (a) a water soluble polymer having a weight average molecular weight of less than 25,000 comprising an unsaturated carboxylic acid and an unsaturated sulfonic acid, or their salts, having a ratio of 1:20 to 20:1, and (b) at least one compound selected from the group consisting of water soluble poly-carboxylates, phosphonates, phosphates, polyphosphates, metal salts and sulfonates. The Persinski patent presents chemical combinations which prevent scale and corrosion; however, the Persinski patent does not address potable water, drinking water, the filtration of potable water, the addition of disinfectants or an apparatus or a method of addition of a at least one of: chelants, dispersants and disinfectants to potable water. More specifically, Persinski does not at all address the importance of removing solids or metals from the water. Persinski specifically states, "The instant invention is also directed to a method of inhibiting the formation of insoluble alluvial, metal oxide and metal hydroxide deposits in an aqueous system . . . " As soluble compounds, metals are much more difficult to remove by filtration; therefore, under a worst case scenario Persinski presents technology which would be toxic in applications wherein heavy metal(s) are present in the drinking water. Under a best case scenario, Persinski presents technology which in drinking water would lead to the disinfectant oxidizing the soluble metal(s), which would lead to taste issues. In any event, Persinski presents a technology wherein the metals could not be removed or would be very difficult to remove. In contrast, an insoluble alluvia metal, a metal oxide or a metal hydroxide can be easily filtered. Further, a metal in its cationic valence state can be removed via many chemical mechanisms, most of which entail the use of sulfur.

U.S. Pat. No. 4,855,061 issued to Martin on Aug. 8, 1989 presents an apparatus for controlling a coagulant dosage rate. This apparatus includes a charge sensor located adjacent a coagulant pump for measuring the net electrical charge on coagulated water before water treatment and a turbidity meter for measuring the effluent turbidity after water treatment. While Martin discloses an apparatus to control a coagulant dosage, thereby controlling water turbidity, Martin does not address water scale, filtration or the addition of either a chelant, dispersant or a disinfectant. Lastly, Martin does not discuss the treatment of potable water. It is very unlikely that potable water would require a coagulant, as coagulants are added to raw waters, not to potable waters.

U.S. Pat. No. 5,254,264 issued to Armstrong on Oct. 19, 1993 presents a method of dispensing scaling inhibitors into a flow of low-pressure water by modifying the use of available air lubricators.

U.S. Pat. No. 5,178,768 issued to White, on Jan. 12, 1993 presents a mixed filter bed composition for purifying water for human consumption containing inorganic, organic and biological contaminants, said composition comprising: (a) from about 40% to about 80% by weight of carbonous sorbent; (b) from about 5% to about 20% by weight of activated alumina; (c) from about 5% to about 20% by weight of silica hydrogel; (d) from about 5% to about 20% by weight of zeolite; and (e) from about 0% to about 10% by weight of metallic components that generate metallic cations. While White discloses a novel filter media combination, White does not describe a method for controlling scale of sludge deposits in potable water. Most significantly, White does not disclose a method for adding a disinfectant to the water after filtration; the While filtration design leaves the water susceptible to bacterial and viral contamination after filtration. The only method around such a contamination issue with White would be to leave enough metallic cations in the water after filtration to eliminate biological or viral growth; such a design would leave the water outside of the heavy metals requirements as set forth by the U.S. EPA and/or NSF International, as such the water would be toxic and not be fit for human consumption. Further, White does not disclose an apparatus or method of chemical addition to potable drinking water.

U.S. Pat. No. 5,419,836 issued to Ray, et al., on May 30, 1995 presents a method for dispensing a plurality of additives into untreated ground water contained in a poultry watering system. The method comprises supplying untreated ground water contained in a poultry watering system, circulating the water, fluidly connecting a plurality of feed containers containing the plurality of additives to the water, the additives including a scale inhibitor and an oxidant, proportionately dispensing, in relationship to flow, the plurality of treatment additives using hydraulically operated pumps and filtering unwanted matter from the water. While it is obvious that Ray is the closest prior art to the invention, Ray does not provide a system of treatment that would be applicable to potable, drinking, water. Ray does not discuss the use of a dispersant when dispersants would be required in water heating applications; this only follows since the methods of Ray are for industrial and poultry applications. Further, Ray specifically states that "Feed pumps, such as hydraulic pumps, proportionally dispense the additives into the water stream. Then, a filter removes unwanted matter." Further, the figure associated with the Ray patent clearly shows the filter as the last piece of equipment. This method is not viable in drinking water, as the filter if at all capable of removing organics will also remove the oxidant or disinfectant, thereby leaving the water without a disinfectant and capable of contamination with bacteria and/or viruses downstream.

U.S. Pat. Nos. 5,575,919 issued to Santina on Nov. 19, 1996; 5,866,014 issued to Santina on Feb. 2, 1999; and 6,093,328 issued to Santina on Jul. 25, 2000 present that Arsenic and TOC are removed from drinking water or wastewaters by use of finely-divided metallic iron in the presence of powdered elemental sulfur or other sulfur compounds such as manganese sulfide, followed by an oxidation step. A premix may be produced for this process, by adding the iron, sulfur and oxidizing agent to water in a predetermined pH range. The iron and sulfur are mixed for a period of time dependent upon the temperature and pH of the water and the presence of complexing or sequestering minerals and organic acids in the water. An oxidizing agent is added to the mixture and agitating is continued. In a preferred embodiment the oxidizing agent is hydrogen peroxide. Water is decanted from the mixture after a sufficient reaction time, to produce a concentrated premix. This premix can be added to water intended for drinking or to industrial effluents containing toxic materials. Santina presents compositions, all of which contain an iron sponge, along with sulfides. While very good at removing Arsenic, these compositions will add soluble iron to the water and have the potential of adding sulfides to the water. Iron, while a nutrient can stain porcelain fixtures. Sulfides are odiferous with an odor threshold of a part per billion in air. Santina does not teach or suggest a method of controlling scale deposits, removing bacteria and viruses or adding a disinfectant.

U.S. Pat. No. 6,368,510 issued to Friot on Apr. 9, 2002 presents a method and apparatus for removing arsenic from water at point of entry or point of use particularly for residential application. The point of entry system comprises a first stage having a manganese greensand oxidizer to convert arsenite (As+3) present in the water to arsenate (As+5) and a second stage for passing the water through an anion exchange resin. Each stage includes a control head for automatic regeneration at a predetermined frequency. The manganese greensand is regenerated with a solution of potassium permanganate and the anion exchange resin is regenerated with a salt solution. An alternate embodiment for point of use application comprises a manganese greensand oxidizer cartridge to convert arsenite (As+3) to arsenate (As+5) followed by removal of the arsenate (As+5) with a reverse osmosis system.

U.S. Pat. No. 6,387,276 issued to Nikolaidis on May 14, 2002 presents a method for the remediation of arsenic, comprising providing an aqueous solution of inorganic arsenic species, and passing the solution of inorganic arsenic species over a substrate comprising zero valent iron under anaerobic conditions, thereby reducing the arsenic species and forming arsenic-metal co-precipitates. Preferably, the metal is iron in the form of iron filings, and a source of sulfate ions is also present, resulting in the precipitation of arseno-pyrites.

U.S. Pat. No. 6,461,535 issued to Esparza on Oct. 8, 2002 presents a method of Arsenic removal from water. The process includes (a) contacting a clay, a coagulant, and an oxidizer with water containing arsenic to form a coagulated colloidal mixture; (b) adsorbing the arsenic onto the coagulated colloidal mixture; and (c) separating the water from the coagulated colloidal mixture. The invention also provides a composition ready for use in removing arsenic from ground water to be used in remote areas. The composition includes an activated clay, a coagulant, and an oxidizer in predetermined proportions for efficient removal of arsenic from ground water. Esparza requires the use of a coagulant and clay, along with a method of removing the colloidal precipitates.

These registered patents do not take into account a method, a system or an apparatus for treating municipal potable water or well water for human consumption that is available for use by potable water using entities, wherein the water is: filtered with a carbon media to remove organic contaminants, filtered to less than 1 micron or less than 0.10 NTU to remove biological or viral contaminants, chelated with at least one of: calcium, magnesium, iron or manganese in combination with dispersing any chelated minerals and/or dispersing any mineral salts, removing any heavy metals and disinfecting the water, while performing any and all chemical additions proportionately to a concentration that is within NSF Guidelines.

SUMMARY OF THE INVENTION

An embodiment of the invention is to devise methods, systems and apparatus to purify potable water.

Another embodiment of the invention is to devise effective, efficient and economically feasible methods, systems and apparatus for improving the quality of potable water by controlling scale and sludge deposits from potable water.

Another embodiment of the invention is to devise effective, efficient and economically feasible methods, systems and apparatus for maintaining the mineral composition of potable water while controlling scale deposits from potable water.

Another embodiment of the invention is to devise effective, efficient and economically feasible methods, systems and apparatus for controlling scale deposits from potable water without adding sodium or potassium to the water or performing cation exchange.

Another embodiment of the invention is to devise effective, efficient and economically feasible methods, systems and apparatus for removing heavy metals from potable water.

Another embodiment of the invention is to devise effective, efficient and economically feasible methods, systems and apparatus to control biological, viral and animal contaminants in potable water.

Another embodiment of the invention is to devise effective, efficient and economically feasible methods, systems and apparatus to reduce the turbidity in potable water.

Another embodiment of the invention is to devise effective, efficient and economically feasible methods, systems and apparatus to maintain disinfection in potable water.

Another embodiment of this invention is to provide economically feasible methods, systems and apparatus to remove taste and odor molecules from potable water.

A final embodiment of this invention is to provide methods, systems and apparatus to improve the purity and the quality of potable water that is relatively inexpensive as compare to other methods, systems and apparatus that are currently employed.

Additional advantages of the invention will be set forth in part in a detailed description which follows, and in part will be obvious from the description or may be learned by practice of the invention. The present invention provides a potable water treatment system and apparatus for treating potable water and methods of operating the potable water treatment system upon administering filtration and at least one disinfectant, as well as potentially one or more chemical additive(s) to the potable water in the potable water line. The potable water treatment system and apparatus of this invention include a filter to reduce the TOC in the potable water to less than 1 mg/L and the turbidity in the potable water to less than 0.10 NTU, in combination with: a measuring device for measuring at least one of: the water flow rate and water contaminants, a proportioning device for determining the amount of at least one and potentially many chemical additive(s), and at least one and potentially a number of controlling chemical pump(s) to add the required amount(s) of the number of chemical additive(s) to the potable water, along with an in-line mixer(s) to mix the chemical additive(s), wherein at least a disinfectant is added to the water in the required amount and the disinfectant is added downstream of filtration to control the growth of bacterial, viral and animal species downstream. The potable water treatment system and apparatus of this invention has the capability of analyzing water quality via water quality sensing device(s), wherein a signal output from the sensing device(s) is electronically or mechanically transferred to at least one of: a water quality alarm and/or the proportioning device, wherein the proportioning device sends a mechanical or electrical proportional signal to the controlling chemical pump(s) to add the required amount(s) of chemical additive(s) to the potable water in the potable water line.

BRIEF DESCRIPTION OF THE DRAWINGS

A better understanding of the present invention can be obtained when the following detailed description of the preferred embodiments are considered in conjunction with the following drawings, in which.

DETAILED DESCRIPTION OF THE PREFERRED EMBODIMENTS

The present invention is described in connection with one or more preferred embodiments. However, it should be understood that the invention is not limited to those embodiments. In contrast, the invention includes all alternatives, modifications and equivalents as may be included within the spirit and scope of the specification and of the appended claims.

Figure 1:
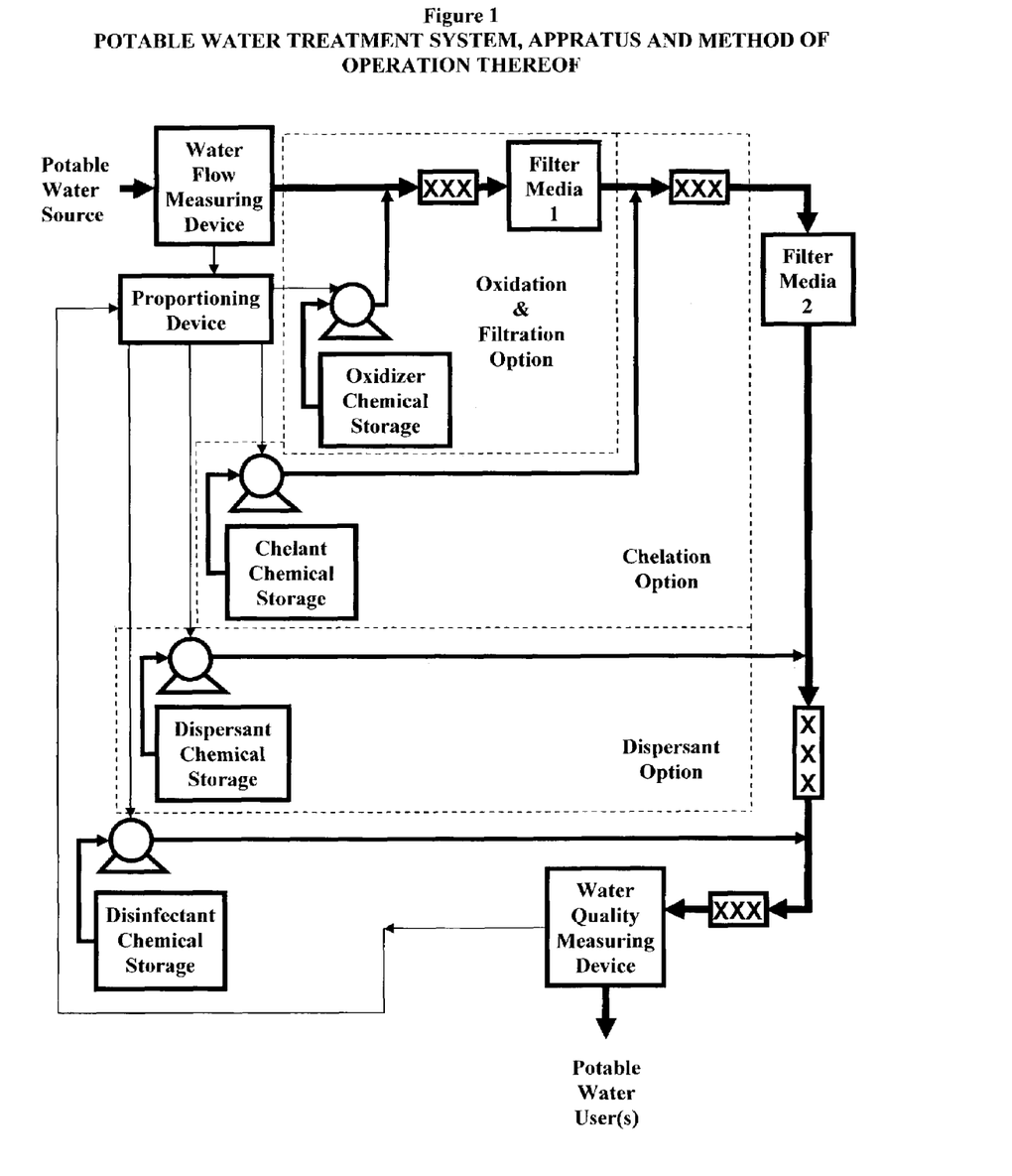
FIG. 1 is a chart illustrating the preferred embodiments of this invention in block diagram form. A number of embodiments are described below.

The potable water treatment system and apparatus of the present invention purifies and treats potable water which is from a Potable Water Source and is delivered via a potable water line to Potable Water User(s), as depicted in FIG. 1. The Potable Water can be either: municipal water which is obtained from surface water treatment or a well or a spring, or a well or a spring. The present invention provides a potable water purification system and apparatus, as depicted in FIG. 1, wherein the water is preferably filtered to an NTU of equal to or less than 0.10 and a TOC content of less than 1 mg/L in combination with the addition of a disinfectant to the potable water I the potable water line downstream of filtration. In the potable water line, preferably a flow measuring device measures the quantity of potable water and operates in conjunction with a proportioning device, wherein the proportioning device operates with a number of chemical feed pump(s), one of which proportionately adds said disinfectant to the potable water in the potable water line.

The potable water line, which is a closed conduit transferring water from the Potable Water Source through the Potable Water Treatment System and Apparatus and to the Potable Water Users can consist of potable water pipes, tubing members and/or any potable water approved plumbing material as listed by ANSI/NSF Std. 61, which is capable of transferring the potable water.

The water flow measuring device can be any device as is known in the art; however the device must be capable of transferring a mechanical, pneumatic or electrical signal to the proportioning device, wherein the signal changes with the quantity of flow. It is most preferred that the flow measuring device be a mechanical one of "paddle wheel" type construction, which provides a direct mechanical signal to the proportioning device. It is preferred that the flow measuring device send an electrical signal to the proportioning device. It is preferred that the flow measuring device send a pneumatic signal to the proportioning device. The flow measuring device can be of any measuring technology or design as long as each chemical additive is added in the required amount to the potable water line and the measuring device is capable of communicating with the proportioning device or directly with the chemical pump(s). The flow measuring device may also serve as the proportioning device, communicating directly with the number of pump(s) to be proportioned. The flow measuring device can be, yet is not limited to a paddle wheel design, differential pressure, ultrasonic, magnetic or any other type that is capable of measuring quantity of flow.

The potable water flow measuring device preferably sends a mechanical, pneumatic or electrical signal to a proportioning device, wherein the proportion is determined for at least one and as many as four or more chemical addition(s). The water quality measuring device, if used, preferably sends a mechanical, pneumatic or electrical signal to a proportioning device, which is most preferably the same proportioning device operating with the flow measuring device, but not necessarily so. It is preferred that the water quality measuring device, if used, measure the water quality downstream of disinfectant addition; however, it is an embodiment that the water quality measuring device measure water quality at any point in the potable water line as depicted in FIG. 1.

It is most preferred that a single proportioning device be used, whether or not water quality is measured by a water quality measuring device. It is an embodiment to have a separate proportioning device for water flow measurement proportioning of chemical addition and a separate proportioning device for water quality measurement proportioning of chemical addition. It is most preferred that the proportioning device(s) be able to utilize a mechanical signal from the flow measurement device; an example of such would be a gear type system, wherein the chemical feed ratio is determined by a gear ratio. The proportioning device can be of any control logic technology as long as the proportioning device is able to communicate with, or also serve as, the measuring device and communicate with or control the number of chemical pump(s) in order to proportion chemical feed to the potable water.

The proportioning device(s) is to receive an electrical, pneumatic or mechanical input from at least one of: the water flow measuring device, the water quality measuring device and/or a combination thereof, proportion the input(s) and provide a proportioned mechanical, pneumatic or electrical output signal to at least one or as many as four or more chemical feed pump(s). The chemical feed pump(s) transfer the proportionately controlled amount of chemical(s) to the potable water, depending upon the option chosen. (The chemicals can be liquid, solid or in solution.) The option or options chosen is dependent upon the historical potable water quality. However, in all cases a disinfectant is chosen to be added to the potable water downstream of Filter Media 2 to ensure that the potable water contains a disinfectant to minimize bacterial, viral and/or animal growth in the potable water, as used by the Potable Water User(s).

The chemical pump(s) may be of any design known in the art. It is most preferred that the pump(s) be of positive displacement design. It is preferred that the pump(s) be either of diaphragm, gear or peristaltic design. It is most preferred that the pump(s) be capable of pump suction static lift so as to eliminate the potentiality of gravity addition of chemicals when chemical addition is not intended. It is most preferred that the pump(s) be driven with a mechanical input directly from the proportional device(s) or the measuring device. It is an embodiment that the pump(s) operate electrically and be controlled by an electrical input from the proportioning device(s) or the measuring device(s). It is an embodiment that the pump(s) operate electrically or pneumatically and be controlled by a pneumatic input from the proportioning device(s) or the measuring device(s). It is most preferred that the pump(s) be capable to proportion chemical feed in direct proportion to a mechanical, pneumatic or electrical signal from at least one of the measurement device(s) and/or the proportioning device(s). The number of pump(s) can be of any liquid or solid transport technology as long as the number of pump(s) can be proportioned directly by the measuring device(s) or by the proportioning device(s). The number of pump(s) must fail in the off or closed flow position in case of a loss or surge in electrical power, if electrical power is used. It is most preferred that the pump(s) have a fail-safe so as not to add chemical when there is not a signal from a proportional device to do so.

It is most preferred that the water flow measuring device, the proportioning device(s) and the chemical pump(s) be one integral mechanical unit. It is most preferred that this one integral unit be driven by the water flow. It is most preferred that the communication between the flow measurement device, the proportioning device and the pump(s) be of mechanical nature so as to limit the need for electricity or compressed gas. A mechanical design allows for the energy (pressure) in the potable water stream to be utilized as the energy to operate the potable water treatment system and apparatus.

There is to be no circulation of the potable water from the potable water line through the chemical feed system and apparatus. In contrast the chemical feed system and apparatus is to add the chemical additive(s) directly into the potable water in the potable water line. It is in the potable water line that the number of chemical additive(s) come into contact with the potable water that is to be transferred to the number of Potable Water User(s). Contact of the chemical additives with the potable water is preferably accomplished utilizing the turbulence of water flow. Contact of the chemical additives with the potable water is most preferably accomplished with an in-line mixer(s). The potable water is not to leave the potable water line, the mixers or the filters, except through the potable water line to the Potable Water User(s).

The water quality measuring device(s), if utilized, is preferred to operate with a water quality alarm. The water quality alarm could be set for any of the water quality parameters in this specification. The alarm signal could be sent to an alarm located at the Potable Water User(s) or to an alarm located with an operator or to a technician. It is most preferred that the water quality measuring device(s) send a mechanical signal to the proportioning device. It is an embodiment that the water quality measuring device(s) provide an electrical signal to the proportioning device(s). It is an embodiment that the water quality measuring device(s) provide a pneumatic signal to the proportioning device(s). The water quality measuring device(s) can be utilized to measure any water quality parameter that is known in the art. The most preferred parameters would be: turbidity (NTU), TOC, pH, heavy metals, conductivity, color, hardness, alkalinity, disinfectant concentration and/or a combination therein. The water quality measuring device is preferred to sense with spectraphotometry at least one of: TOC, heavy metals, color, hardness, alkalinity, disinfectant concentration and/or any combination therein in the potable water. The water quality measuring device is preferred to sense with conductivity at least one of: pH and/or conductivity in the potable water. The water quality measuring device is preferred to sense turbidity with light scatter in the potable water.

The minimal water purification and treatment required by this invention is filtration followed by disinfectant chemical addition. Given that TOC is the precursor to disinfection by-products and that a disinfectant is required in the water to prevent biological and/or viral growth, removal of TOC and any previously formed disinfection by-products prior to disinfection is most preferred. Filter compositions based upon carbon chemistry, such as: powdered carbon, powdered activated carbon, granular carbon, granular activated carbon are preferred to adsorb TOC and disinfection by-products. Disinfectants to be used include, but are not limited to: bleach, chlorine, muriatic acid, ozone, chlorine dioxide, peroxide and/or any combination therein.

In addition to filtration and disinfection, there are three options depicted in FIG. 1. The dispersant option would add a dispersant in proportion to at least one of: the water flow, chelant addition and/or a combination thereof. The chelant option would add a chelant in proportion to at least one of water: flow, hardness, conductivity, heavy metals concentration and/or a combination thereof. It is preferred to utilize the chelant option in combination with the dispersant option to eliminate mineral phosphate salt deposition at water temperatures of over 130° F. In cases wherein heavy metals removal is not required with phosphates, it is preferred to add the chelant and the dispersant as a mixture. In cases wherein heavy metal(s) removal or sequestering is required with a phosphate, it is preferred to add phosphoric or pyrophosphoric acid to the potable water upstream of mixing and filtration, thereby allowing the phosphate to contact the heavy metal(s) to a residual heavy metal(s) concentration which is below health limits. In the case of Arsenic, the health limit is currently 10 micrograms per liter. In the case of aluminum, the proposed health limit is currently 50 micrograms per liter. Each heavy metal has a health concentration limit. Downstream of mixing, it is preferred to filter the metal phosphate(s) out of solution. As depicted in FIG. 1, filtration is preferably accomplished with Filter Media 1 and/or Filter Media 2.

The oxidizer option is to be utilized to perform at least one of: oxidation of metals to facilitate metal phosphate formation, oxidation of metals to a metal oxide or hydroxide composition, oxidation of metals to facilitate metal sulfide formation, oxidation of taste and odor molecules, disinfection, oxidation of TOC molecules and/or a combination therein. Oxidizers which are embodiments of this invention can be, but are not limited to: permanganate, bleach, aqueous ozone, ozone, hydroxides, peroxides, aqueous chlorine dioxide, pure chlorine dioxide, muriatic acid, any other applicable chemical oxidizer and/or any combination therein. Should the oxidizer option be utilized, it is preferred to pH adjust with at least one of: the chelant added from chelant chemical storage, the dispersant added from dispersant chemical storage, the disinfectant added from disinfectant storage and/or any combination therein. Which ever chemical pump(s) transfer the pH adjustment chemical(s) will preferably be proportionately controlled via the proportioning device, wherein the proportioning device utilizes at least one of: oxidizer addition and/or final pH as input(s) in order to provide an output to the chemical pump(s) transferring the pH adjustment chemical(s), thereby maintaining the final potable water pH between 7.0 and 10.0, preferably between 8.0 and 9.0.

To facilitate metals removal in acidic waters (waters with a pH below 7.0 to 8.0), it is a preferred embodiment to add a base or a buffer upstream of Filter Media 1 and/or Filter Media 2, so as to create a metal oxide and/or a metal hydroxide which will be insoluble and filterable by Filter Media 1 and/or Filter Media 2. As depicted in FIG. 1, it is preferred that a separate filter media, such as Filter Media 1, be utilized to remove the reactants of oxidation or the reactants to the addition of a base prior to NTU/TOC filtration. Should a base or buffer be added to facilitate metals removal, it is preferred that the pH in the potable water at filtration of the metal oxides and/o hydroxides be between 7.0 and 10.0; and most preferably be between 8.5 and 9.5.

By filtering the potable water and chemically treating the potable water according to at least one of: flow rate, turbidity, pH, TOC, conductivity, disinfectant concentration, heavy metals concentration and/or any combination therein, the potable water treatment system and apparatus depicted in FIG. 1 is far more accurate, more efficient and less expensive than earlier water treatment systems. In addition, the present potable water treatment system and apparatus will operate independently of the potable water source and, thus, may be connected to any desired portion of the potable water line.

It is an embodiment to combine chemical additives, should the treatment scheme allow such combination and the chemicals are compatible in storage. It is a preferred embodiment to add a number of the chemical(s) with the disinfectant, thereby having only one chemical pump. One such combination could be: bleach, sodium hydroxide and phosphoric acid. Another combination would be tocopherol acetate (Vitamin E) and phosphoric acid separate from bleach addition. Another combination would be an acrylate polymer with a phosphate polymer separate from hydrogen peroxide or bleach or chlorine addition. However, any number of chemical pump(s) many be used with any number of chemical feed source(s), that consist of one or more sections in which the number of chemical additives are separately or combinedly contained and that are controlled (either directly or indirectly) by the corresponding number of chemical pump(s), to transfer any number of chemical additives in any desired combination from the number of chemical feed sources(s) to the potable water line, as long as a disinfectant is added downstream of the final media filter.

The potable water treatment system and apparatus enables the number of Potable Water User(s) to control: alkalinity, pH, taste, odor, metal(s) concentration, water deposits, bacterial contamination, viral contamination, animal contamination, organic content and corrosion. The potable water treatment system and apparatus has a relatively simple construction which can be easily disassembled for inspection, cleaning and/or replacement of components. It is most preferred that the potable water treatment system and apparatus be injection molded and assembled by at least one of: snap together, bolt together or weld together parts and/or any combination therein. It is most preferred that the potable water treatment system and apparatus be made of engineering resins, such as: poly nylon, poly acetal, poly carbonate, poly ester and/or any combination therein. Polyolefin materials of construction are an embodiment, as well. While metal construction is an embodiment, metal construction is not preferred due to corrosion from the water, the elements and the addition chemicals, as well as final assembled cost.

Filter media design can incorporate at least one of: powdered carbon, powdered activated carbon, granular carbon, granular activated carbon, sand, gravel, green manganese sand, anthracite, zeolite, activated alumina, clay, membrane and/or any combination therein. Filter media design is critical in determining final water quality. Filter media material and particle size will determine particle size filterability. It is most preferred that Filter Media 2 be at least one of: sand, gravel, powdered carbon, powdered activated carbon, granular carbon, granular activated carbon, zeolite, membrane and/or a combination therein having a particle size so as to maintain a filtered NTU of 0.10 or less for a reasonable amount of time, 6 months is preferred and 12 months is most preferred. A filtered NTU of 0.10 or less is required to meet the Drinking Water Optimization Requirement of the U.S. EPA. Should there be a filter upstream of Filter Media 2, such as is depicted in the Oxidation and Filtration Option, the filter media needs to be sized so as to remove the oxidized particles. It is an embodiment to operate the Oxidation and Filtration Option utilizing only Filter Media 2, not utilizing Filter Media 1. The potable water treatment system and apparatus is to be operated with at least one Filter Media and can operate with as many Filter Media as is practical. Inclusion of Filter Media creates pressure losses which may result in the addition of an upstream potable water pump. It is an embodiment to augment the potable water treatment system and apparatus with an upstream potable water pump. Certain phosphate acids and phosphate acid/polymer blends are known in the art to sequester metal(s) which can then be removed in a Filter Media. Certain sulfur containing chemicals, such as alkyl sulfides, iron sulfide media and alkali-metal sulfide salts are known to form colloidal particles with metals in aqueous solution. Should a sulfur chemical be used as a heavy metal coagulant to facilitate metals removal, it is preferred that at least a portion of the filter media be at least one of: activated carbon, granular activated carbon, activated alumina, cationic ion exchange resin, membrane and/or any combination therein. Should sulfur chemistry be used to facilitate heavy metal removal, in order to minimize the formation of sulfides in the water it is preferred to utilize the sulfur attached to a non-iron media, such composition as: sulfur coated powdered activated carbon, sulfur coated granular carbon, sulfur coated alumina, sulfur coated clay, sulfur coated green sand, sulfur coated sand, sulfur coated cationic exchange resin and/or any combination therein. It is preferred to remove heavy metals by first passing the potable water through green sand to oxidize the heavy metal(s) to the cationic valence state, and second to pass the potable water through said sulfur coated media to adsorb the heavy metal(s). By utilizing at least one of: oxidation in combination with filtration, wherein greensand and/or chemical oxidation is used in combination with sulfide reaction chemistry and/or in combination with at least one of: activated media, membrane media, cation exchange media and/or a combination therein; green sand and/or oxidation in combination with phosphate chemistry in combination with 0.10 NTU filtration; and/or any combination therein, heavy metal(s) removal to a concentration less than the health requirements proclaimed by the U.S. EPA is attainable. Due to the potential formation of hydrogen sulfide and sulfur dioxide in the potable water, it is most preferred not to use sulfide salts. To eliminate iron contamination in the potable water, if a metal sulfide media is used, activated alumina sulfide media is most preferred. Should nanofiltration or any membrane filtration be employed that removes the minerals from the potable water, it is preferred to add a mineral salt in combination with disinfection; the most preferred mineral salt in said instance is one containing at least one of calcium and/or magnesium.

Chelants can be used to complex and prevent the deposition of many cations, including hardness and heavy metals. Chelants or chelating agents are compounds having a heterocyclic ring wherein at least two kinds of atoms are joined in a ring. Chelating is forming a heterocyclic ring compound by joining a chelating agent to a metal ion. Chelants contain a metal ion attached by coordinate bonds (i.e. a covalent chemical bond is produced when an atom shares a pair of electrons with an atom lacking such a pair) to at least two nonmetal ions in the same heterocyclic ring. Examples of the number of chelants used for mineral deposition in the present potable water treatment system and apparatus are water soluble phosphates consisting of phosphate polymers, phosphate monomers and/or any combination thereof. The phosphate polymers consist of, but are not limited to, phosphoric acid esters, metaphosphates, hexametaphosphates, pyrophosphates and/or any combination thereof. Phosphate polymers are particularly effective in dispersing magnesium silicate, magnesium hydroxide and calcium phosphates. Phosphate polymers are particularly effective at corrosion control. With proper selection of a polymer, along with maintaining an adequate polymer concentration level, the surface charge on particle(s) can be favorably altered. In addition to changing the surface charge, polymers also function by distorting crystal growth. Chelants lock the metals in the potable water into soluble organic ring structures of the chelants. Chelants provide reactive sites that attract coordination sites (i.e. areas of the ion that are receptive to chemical bonding) of the cations. Iron, for example, has six coordination sites. All coordination sites of the iron ion are used to form a stable metal chelant. Chelants combine with cations such as calcium, magnesium, iron and copper that could otherwise form deposits. The resulting chelated particles are water soluble. The effectiveness of chelant(s) is limited by the concentration of competing anions, alkalinity and temperature.

The effect of adding sufficient amounts of the number of chelant(s) by the present invention is to reduce the available free calcium and magnesium ions in the potable water and therefore, reduce the phosphate demand. Phosphate, such as phosphoric acid and/or pyrophosphoric acid is used to complex or form metal phosphates, which are insoluble. In the preferred embodiments, phosphate polymers, such as metaphosphate and/or hexametaphosphate is used as a corrosion inhibitor and as a chelant to prevent correspondingly any precipitation of calcium and/or magnesium, while providing corrosion control. Metaphosphate and/or hexametaphosphate, as well as polymers based upon this chemistry, soften the potable water by removing the free calcium and/or magnesium ions from the potable water and by bringing the calcium and/or magnesium into a soluble slightly-ionized compound or radical, thus preserving the calcium and/or magnesium ions (which are beneficial to human health) and deleting any hardness of the potable water that is due to free calcium and/or magnesium ions. The addition of metaphosphate and/or hexametaphosphate not only completely softens the potable water against soap so as to completely prevent the formation of insoluble calcium and magnesium soaps (which may be carried with clothes during laundering), but also effects this softening without the formation of any solid precipitates of calcium and/or magnesium and without rendering the potable water alkaline. In addition, the potable water containing any excess metaphosphate and/or hexametaphosphate will actually dissolve any phosphate or carbonate which may be deposited in the potable water line. Metaphosphate and/or hexametaphosphate do not throw the calcium and/or magnesium out of solution as is the case of usual water softening compounds, but rather lock up the calcium and/or the magnesium in a calcium-metaphosphate and/or a magnesium-hexametaphosphate complex molecule; these molecules provide a one or two molecule thickness coating on metal surfaces to limit metal corrosion. This is particularly important for iron, steel, copper, copper alloys used in appliances, fixtures and plumbing.

A dispersant is preferred to be added to the water to prevent scale. Dispersants are low molecular weight polymers, usually organic acids having a molecular weight of less than 25,000 and preferably less than 10,000. A dispersant is most preferred at water temperatures over 130 ° F., such as in all hot water applications, wherein the calcium and/or magnesium phosphate is scale forming. Dispersant chemistry is based upon carboxylic chemistry, as well as alkyl sulfate, alkyl sulfite and alkyl sulfide chemistry; it is the oxygen molecule that creates the dispersion, wherein the oxygen takes its form in the molecule as a carboxylic moiety and/or a sulfoxy moiety. As such, in the present invention, tocopherol acetate (Vitamin E), as well any variant of Vitamin E that is high in carboxylic moiety, is a preferred dispersant. Dispersants that can be used in this invention which contain the carboxyl moiety are, but are not limited to: acrylic polymers, acrylic acid, polymers of acrylic acid, methacrylic acid, maleic acid, fumaric acid, itaconic acid, crotonic acid, cinnamic acid, vinyl benzoic acid, any polymers of these acids and/or any combination therein. Dispersants that can be used in this invention are molecules which contain the carboxyl moiety and which are water soluble, wherein the toxicity of that compound is low enough to be listed per ANSI/NSF Std. 60. Dispersants that can be used in this invention which contain the alkyl sulfoxy or allyl sulfoxy moiety include any alkyl or allyl compound, which is water soluble containing a moiety that is at least one of: $SO$, $SO_2$, $SO_3$, and/or any combination therein, wherein the toxicity of that compound is low enough to be listed per ANSI/NSF Std. 60. Due to the many ways in which an organic molecule can be designed to contain the carboxyl moiety and/or the sulfoxy moiety, it is an embodiment of this invention that any water soluble organic compound containing at least one of a: carboxylic moiety and/or a sulfoxy moiety, wherein the toxicity of that compound is low enough to be listed per ANSI/NSF Std. 60 can be used as the dispersant. (This is with the knowledge that not all dispersants have equivalent dispersing properties.) Acrylic polymers exhibit very good dispersion properties, thereby limiting the deposition of water soluble salts and are most preferred embodiments as a dispersant in this invention. The limitation in the use of a dispersant is in the dispersants water solubility in combination with its carboxylic nature and/or sulfoxy nature in combination with its ANSI/NSF Std. 60 listing in drinking water applications. Dispersants can be reliably measured in water using spectraphotometry.

A relatively large percentage of the available sources of potable water contain taste and/or odor issues. Taste and/or odor is usually from organic contaminants which are byproducts of algal blooms; blue-green algae is known in the art to be a significant cause. The most common compounds that create taste and/or odor are sulfides, Geosmine and MIB. To remove taste and/or odor from potable water, oxidizers are preferred. Oxidizers previously mentioned, which are an embodiment of this invention include, but are not limited to: chlorine, hydrochloric acid, bleach and all variants of hypochlorite chemistry, chlorine dioxide, ozone, peroxide, hydroxide, permanganate and/or any combination therein. In addition, it is most preferred to remove taste and/or odor from the potable water to perform adsorption of the oxidized molecules downstream of oxidation. Materials that are an embodiment of this invention which can be used in the Filter Media to adsorb oxidized molecule(s) include, but are not limited to: carbon, activated carbon, granular carbon, granular activated carbon, cationic ion exchange media, membrane and/or any combination therein.

In summary, advantages of the potable water treatment system and apparatus are:
1. Minimization to elimination of mineral and/or metal deposits from potable water, specifically in water temperatures above 130° F.,
2. Control of bacteria, virus and/or animal contamination in potable water by filtration combined disinfection.
3. Maintenance of a desirable pH in the potable water to prevent corrosion without the accumulation of alkalinity beyond that desirable,
4. Control of corrosion in materials that contact potable water,
5. Elimination of costly chemical additive feed equipment for potable water,
6. Minimization of heavy metals in potable water, Certain objects are set forth above and made apparent from the foregoing description. However, since certain changes may be made in the above description without departing from the scope of the invention, it is intended that all matters contained in the foregoing description shall be interpreted as illustrative only of the principles of the invention and not in a limiting sense. With respect to the above description, it is to be realized that any descriptions, drawings and examples deemed readily apparent and obvious to one skilled in the art and all equivalent relationships to those described in the specification are intended to be encompassed by the present invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention. It is also to be understood that the following claims are intended to cover all of the generic and specific features of the invention herein described, and all statements of the scope of the invention, which, as a matter of language, might be said to fall in between.

I claim:

1. A system for treating potable water transferred from a potable water source to a number of potable water user(s) via a potable water line for a residential, office, public or commercial building, said system comprising:
   (a) a filter performing filtration of said potable water flowing through said potable water, said filter operating in combination with,
   (b) a disinfectant chemical feed system comprising:
      i. at least one source comprising a disinfectant chemical,
      ii. a potable water flow measuring device providing a signal in proportion to said potable water flow in said potable water line to a proportioning device,
      iii. said proportioning device receiving said signal from said potable water flow measuring device and sending a signal to at least one disinfectant chemical feed pump, and
      iv. at least one of said disinfectant chemical feed pump(s), wherein
         said disinfectant chemical feed pump(s) receive said signal from said proportioning device; such that,
         the required amount of said disinfectant chemical is directed via said disinfectant chemical feed pump(s) from said disinfectant chemical feed source(s) to said potable water in said potable water line downstream of said filter.

2. The system of claim 1, further comprising:
   (c) a number of additive chemical feed source(s) comprising a number of additive chemical(s), and
   (d) a number of additive chemical(s) feed pump(s), wherein said proportioning device sends a signal to said additive chemical(s) feed pump(s); such that,
   the required amount(s) of said number of additive chemical(s) is directed via said number of additive chemical(s) feed pump(s) from said number of additive chemical feed source(s) to said potable water in said potable water line.

3. The system of claim 1 or 2, wherein said filter serves to remove from said potable water at least one selected from a group consisting of: particulate matter, TOC, turbidity, bacteria, viruses and animals.

4. The system of claim 2, wherein a number of filter(s) are in said potable water line upstream of said filter in claim 1; such that,
   said filter of claim 1 in combination with said number of filters upstream of said filter in claim 1 serve to remove from said potable water at least one of a taste and odor molecule, and a heavy metal.

5. The system of claim 1, 2 or 4, wherein said filter further comprises at least one selected from a group consisting of: carbon, activated carbon, granular carbon, granular activated carbon, sand, gravel, green manganese sand, anthracite, zeolite, activated alumina, clay, cationic exchange resin and any combination therein.

6. The system of claim 1, 2 or 4, wherein the final treated potable water turbidity is less than 0.10 NTU and the TOC is less than 1.0 mg/L.

7. The system of claim 1, 2 or 4, wherein said filter further comprises media consisting of at least one selected from a group consisting of: sulfur coated alumina, sulfur coated powdered carbon, sulfur coated granular carbon, sulfur coated clay sulfur coated sand, and sulfur coated cationic exchange resin and any combination therein, wherein said media absorb a heavy metal.

8. The system of claim 1 or 2, wherein said potable water flow measuring device senses flow with at least one selected from a group consisting of: differential pressure, ultrasonic, magnetic and paddle wheel.

9. The system of claim 1 or 2, wherein said disinfectant chemical feed pump(s) or said additive chemical(s) feed pump(s) comprise piston, peristaltic or gear.

10. The system of claim 2, wherein said number of additive chemical(s) is added separately or combinedly, continuously or intermittently and in any state.

11. The system of claim 2, wherein the effective components of said number of additive chemical(s) comprise at least one selected from a group consisting of: any required amount(s) of a number of chelant(s), any required amount(s) of a number of dispersant(s), any required amounts of a number of oxidizer(s), any required amount(s) of a number of phosphoric or pyrophosphoric acid(s) and any combination therein.

12. The system of claim 11, wherein said number of oxidizer(s) comprise at least one chemical selected from a group consisting of: permanganate, bleach, ozone, hydroxide, peroxide, aqueous chlorine dioxide, pure chlorine dioxide, hydrochloric acid, muriatic acid and any combination therein.

13. The system of claim 11, wherein said number of chelant(s) comprise a water soluble phosphate.

14. The system of claim 13, wherein said water soluble phosphate comprises at least one monomer selected from a group consisting of: phosphoric acid ester, phosphoric acid, pyrophosphoric acid, metaphosphate and hexametaphosphate.

15. The system of claim 11, wherein said number of dispersant(s) comprise at least one of a: carboxyl and a sulfoxy moiety.

16. The system of claim 15, wherein said carboxyl moiety comprises at least one monomer selected from a group consisting of: acrylic acid, methacrylic acid, fumaric acid, itaconic acid, crotonic acid, cinnamic acid and vinyl benzoic acid.

17. The system of claim 15, wherein said carboxyl moiety comprises Vitamin E or a variant of Vitamin E.

18. The system of claim 15, 16 or 17, wherein said dispersant can be listed under ANSI/NSF Std. 60.

19. The system of claim 1 or 2, wherein said disinfectant comprises at least one selected from a group consisting of: bleach, chlorine, hydrochloric acid, muriatic acid, ozone, chlorine dioxide and peroxide.

20. The system of claim 2, wherein said potable water flow measuring device, said proportioning device, said disinfectant chemical feed pump(s) and said additive chemical(s) feed pump(s) are separate unit(s), or
   are combined with each other as a single unit, or
   said potable water flow measuring device and said proportioning device are combined into a single unit and said disinfectant chemical feed pump(s) is a separate unit(s), or
   said potable water flow measuring device and said proportioning device are combined into a single unit and said additive chemical(s) feed pump(s) is a separate unit(s), or
   said potable water flow measuring device is a separate unit from said proportioning device and said disinfectant chemical feed pump(s), which are combined into a single unit, or said potable water flow measuring device is a separate unit from said proportioning device and said additive chemical(s) feed pump(s), which are combined into a single unit.

21. The system of claim 2, wherein a water quality measuring device measures the quality of said potable water; and wherein
said potable water quality is measured for at least one selected from a group consisting of: turbidity (NTU), TOC, pH, heavy metals, conductivity, color, hardness, alkalinity, disinfectant concentration and any combination therein.

22. The system of claim 21, wherein said potable water quality measurement is taken downstream of filtration.

23. The system of claim 21, wherein
said water quality measuring device sends a signal to said proportioning device; such that at least one of:
said proportioning device proportion(s) the amount of said disinfectant chemical by sending a signal to said disinfectant chemical feed pump(s), and
said proportioning device proportions the amount(s) of said additive chemical(s) by sending a signal to said additive chemical(s) feed pump(s).

24. The system of claim 23, wherein the alkalinity of said potable water is maintained such that the pH of said potable water in said potable water line downstream of disinfection is between 7.0 and 10.0.

25. The system of claim 2, wherein at least a portion of the system is manufactured by injection molding.

26. The system of claim 25, wherein at least a portion of the system is assembled by at least one selected from a group consisting of parts which: snap together, bolt together, weld together and any combination therein.

27. The system of claim 25, wherein the material(s) of construction comprise at least one selected from a group consisting of: poly nylon, poly acetal, poly carbonate, poly ester, poly olefin and any combination therein.

28. The system of claim 1, wherein said potable water flow measuring device, said proportioning device and said disinfectant chemical feed pump(s) are separate unit(s), or
are combined with each other as a single unit, or
said potable water flow measuring device and said proportioning device are combined into a single unit and said disinfectant chemical feed pump(s) is a separate unit(s), or
said potable water flow measuring device is a separate unit from said proportioning device and said disinfectant chemical feed pump(s), which are combined into a single unit.

29. The system of claim 1, wherein a water quality measuring device measures the quality of said potable water; and wherein
said potable water quality is measured for at least one selected from a group consisting of: turbidity (NTU), TOC, pH, heavy metals, conductivity, color, hardness, alkalinity, disinfectant concentration and any combination therein.

30. The system of claim 29, wherein said potable water quality measurement is taken downstream of filtration.

31. The system of claim 29, wherein
said water quality measuring device sends a signal to said proportioning device; such that at least one of:
said proportioning device proportion(s) the amount of said disinfectant chemical by sending a signal to said disinfectant chemical feed pump(s), and
said proportioning device proportions the amount(s) of said additive chemical(s) by sending a signal to said additive chemical(s) feed pump(s).

32. The system of claim 31, wherein the alkalinity of said potable water is maintained such that the pH of said potable water in said potable water line downstream of disinfection is between 7.0 and 10.0.

33. The system of claim 1, wherein at least a portion of the system is manufactured by injection molding.

34. The system of claim 33, wherein at least a portion of the system is assembled by at least one selected from a group consisting of parts which: snap together, bolt together, weld together and any combination therein.

35. The system of claim 33, wherein the material(s) of construction comprise at least one selected from a group consisting of: poly nylon, poly acetal, poly carbonate, poly ester, poly olefin and any combination therein.

36. In a potable water line for a residential, office, public or commercial building, wherein potable water is transferred from a potable water source to a number of potable water user(s), an apparatus to treat said potable water, said apparatus comprising:
(a) a filter performing filtration of said potable water flowing through said potable water line, said filter operating in combination with,
(b) a chemical feed comprising:
  i. at least one source comprising a disinfectant chemical,
  ii. a device sensing said potable water flow in said potable water line and sending a signal proportional to said potable water flow to a proportioning device,
  iii. said proportioning device receiving said signal from said potable water flow sensing device and sending a signal to at least one disinfectant chemical feed pump, and
  iv. at least one of said disinfectant chemical feed pump(s) receiving said signal from said proportioning device; such that,
    the required amount of said disinfectant chemical is directed via said disinfectant chemical feed pump(s) from said disinfectant chemical feed source(s) to said potable water in said potable water line downstream of said filter.

37. The apparatus of claim 36, further comprising:
(c) a number of additive chemical feed source(s), said number of additive chemical feed source(s) containing a number of additive chemical(s), and
(d) a number of additive chemical(s) feed pump(s), wherein each said additive chemical(s) feed pump receives said signal from said proportioning device; such that,
the required amount(s) of said number of additive chemical(s) is directed via said number of additive chemical(s) feed pump(s) from said number of additive chemical feed source(s) to said potable water in said potable water line.

38. The apparatus of claim 36 or 37, wherein said filter has means to remove from said potable water at least one selected from a group consisting of: particulate matter, TOC, turbidity, bacteria, viruses and animals.

39. The apparatus of claim 37, wherein a number of filter(s) are in said potable water line upstream of said filter in claim 36; such that,
said filter of claim 36 in combination with said number of filters upstream of said filter in claim 36 have the filtration means to remove from said potable water at least one of a taste and odor molecule and a heavy metal.

40. The apparatus of claim 36 or 37, wherein said potable water flow sensing device senses said potable water flow with at least one selected from a group consisting of: differential pressure, ultrasonic, magnetic and paddle wheel.

41. The apparatus of claim 36 or 37, wherein at least one of said disinfectant chemical feed pump(s) and said additive chemical(s) feed pump(s) comprise piston, peristaltic or gear.

42. The apparatus of claim 36 or 37, wherein said signal(s) is at least one selected from a group consisting at mechanical, pneumatic and electrical.

43. The apparatus of claim 37, wherein said potable water flow sensing device, said proportioning device, said disinfectant chemical feed pump(s) and said additive chemical(s) feed pump(s) are separate unit(s), or are combined with each other as a single unit, or said potable water flow sensing device and said proportioning device are combined into a single unit and said disinfectant chemical feed pump(s) is a separate unit(s), or said potable water flow sensing device and said proportioning device are combined into a single unit and said additive chemical(s) feed pump(s) is a separate unit(s), or said potable water flow sensing device is a separate unit from said proportioning device and said disinfectant chemical feed pump(s), which are combined into a single unit, or said potable water flow sensing device is a separate unit from said proportioning device and said additive chemical(s) feed pump(s), which are combined into a single unit.

44. The apparatus of claim 37, further comprising a device sensing turbidity (NTU) in said potable water using the means of light scatter.

45. The apparatus of claim 44, wherein said device sends a signal comprising at least one selected from a group consisting of: electrical, mechanical and pneumatic to an alarm at a predetermined set point.

46. The apparatus of claim 37, further comprising a device sensing at least one selected from a group consisting of: TOC, heavy metals, color, hardness, alkalinity, dispersant concentration, disinfectant concentration and any combination therein in said potable water using the means of spectraphotometry.

47. The apparatus of claim 46, wherein said device sends a signal comprising at least one selected from a group consisting of: electrical, mechanical and pneumatic to said proportioning device, and wherein said proportioning device incorporates said signal from said device to send at least one signal to at least one of said disinfectant chemical feed pump(s) and said additive chemical(s) feed pump(s).

48. The apparatus of claim 46, wherein said device sends a signal comprising at least one selected from a group consisting of: electrical, mechanical and pneumatic to an alarm at a predetermined set point.

49. The apparatus of claim 37, further comprising a device sensing at least one of pH and conductivity in said potable water using the means of conductivity.

50. The apparatus of claim 49, wherein said device sends a signal comprising at least one selected from a group consisting of: electrical, mechanical and pneumatic to said proportioning device, and wherein said proportioning device incorporates said signal from said device to send a signal(s) to said disinfectant chemical feed pump(s) and/or said additive chemical(s) feed pump(s).

51. The apparatus of claim 49, wherein said device sends a signal comprising at least one selected from a group consisting of: electrical, mechanical and pneumatic to an alarm at a predetermined set point.

52. The apparatus of claim 37, wherein at least a portion of said apparatus is manufactured by injection molding.

53. The apparatus of claim 52, wherein at least a portion of said apparatus is assembled by at least one selected from a group consisting of parts which: snap together, bolt together, weld together and any combination therein.

54. The apparatus of claim 52, wherein said material(s) of construction comprise at least one selected from a group consisting of: poly nylon, poly acetal, poly carbonate, poly ester, poly olefin and any combination therein.

55. The apparatus of claim 36, wherein said potable water flow sensing device, said proportioning device and said disinfectant chemical feed pump(s) are separate unit(s), or are combined with each other as a single unit, or said potable water flow sensing device and said proportioning device are combined into a single unit and said disinfectant chemical feed pump(s) is a separate unit(s), or said potable water flow sensing device is a separate unit from said proportioning device and said disinfectant chemical feed pump(s), which are combined into a single unit.

56. The apparatus of claim 36, further comprising a device sensing turbidity (NTU) in said potable water using the means of light scatter.

57. The apparatus of claim 56, wherein said device sends a signal comprising at least one selected from a group consisting of: electrical, mechanical and pneumatic to an alarm at a predetermined set point.

58. The apparatus of claim 36, further comprising a device sensing at least one selected from a group consisting of: TOC, heavy metals, color, hardness, alkalinity, dispersant concentration, disinfectant concentration and any combination therein in said potable water using the means of spectraphotometry.

59. The apparatus of claim 58, wherein said device sends a signal comprising at least one selected from a group consisting of: electrical, mechanical and pneumatic to said proportioning device, and wherein said proportioning device incorporates said signal from said device to send a signal to at least one of said disinfectant chemical feed pump(s) and said additive chemical(s) feed pump(s).

60. The apparatus of claim 58, wherein said device sends a signal comprising at least one selected from a group consisting of: electrical, mechanical and pneumatic to an alarm at a predetermined set point.

61. The apparatus of claim 36, further comprising a device sensing at least one of pH and conductivity in said potable water using the means of conductivity.

62. The apparatus of claim 61, wherein said device sends a signal comprising at least one selected from a group consisting of: electrical, mechanical and pneumatic to said proportioning device, and wherein said proportioning device incorporates said signal from said device to send a signal(s) to at least one of said disinfectant chemical feed pump(s) and said additive chemical(s) feed pump(s).

63. The apparatus of claim 61, wherein said device sends a signal comprising at least one selected from a group consisting of: electrical, mechanical and pneumatic to an alarm at a predetermined set point.

64. The apparatus of claim 36, wherein at least a portion of said apparatus is manufactured by injection molding.

65. The apparatus of claim 64, wherein at least a portion of said apparatus is assembled by at least one selected from a group consisting of parts which: snap together, bolt together, weld together and any combination therein.

66. The apparatus of claim 64, wherein said material(s) of construction comprise at least one selected from a group consisting of: poly nylon, poly acetal, poly carbonate, poly ester, poly olefin and any combination therein.

* * * * *